(12) United States Patent
Nagaishi

(10) Patent No.: US 7,046,849 B2
(45) Date of Patent: May 16, 2006

(54) IMAGE-LAYOUT EVALUATION METHOD, IMAGE-LAYOUT EVALUATION SYSTEM, AND IMAGE-LAYOUT-EVALUATION-PROCESSING PROGRAM

(75) Inventor: Michihiro Nagaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 596 days.

(21) Appl. No.: 10/192,640

(22) Filed: Jul. 11, 2002

(65) Prior Publication Data

US 2003/0086619 A1    May 8, 2003

(30) Foreign Application Priority Data

Jul. 13, 2001    (JP) .............................. 2001-213424

(51) Int. Cl.
 *G06K 9/52* (2006.01)
(52) U.S. Cl. ..................................................... 382/206
(58) Field of Classification Search ................ 382/112, 382/229
See application file for complete search history.

(56) References Cited

U.S. PATENT DOCUMENTS

| 5,845,020 | A | * | 12/1998 | Nagaishi ..................... 382/320 |
| 6,330,358 | B1 | * | 12/2001 | Nagaishi ..................... 382/178 |
| 6,636,650 | B1 | * | 10/2003 | Long et al. ................... 382/295 |
| 6,687,404 | B1 | * | 2/2004 | Hull et al. ................... 382/226 |
| 2003/0086618 | A1 | * | 5/2003 | Nagaishi ..................... 382/229 |
| 2005/0091599 | A1 | * | 4/2005 | Yamakado et al. .......... 715/732 |

OTHER PUBLICATIONS

Nagaishi, Michihiro, "Identifying Ability of a Recognition Method Based on the Field of Induction", IEEE, 1993.*

Ohashi et al., "Text-Independent Writer-Recognition Method using Feature Extraction by induction field in Vision", vol. 54 No. 9, pp. 1305-1310, 2000.*

Masazumi Miyoshi et al., Character Arrangement Design with Kansei Information by Using the Theory of Induction Field on Retina, vol. 82-A, No. 9, pp. 1465-1473, Sep. 1999.

Michihiro Nagaishi, Legible Display of Japanese Characters based on Induction Filed Vision, Image Information Media Society, Dec. 5, 1997.

Nagaishi, "Legible Display of Japanese Characters based on Induction Field in Vision", The Journal of the Institute of Image Information and Television Engineers, vol. 52, No. 12, pp. 1865-1872, 1998.

Miyoshi et al., "Character Arrangement Design with Kansei Information by Using the Theory of Induction Field on Retina", IEICE Transactions, vol. 82-A, No. 9, pp. 1465-1473, 1999.

* cited by examiner

*Primary Examiner*—Jingge Wu
*Assistant Examiner*—Jordan Kuhn
(74) *Attorney, Agent, or Firm*—Oliff & Berridge, PLC

(57) ABSTRACT

The invention provides image layout evaluation method to optimize the layout of an image. The invention can include a laid-out-image input device for inputting laid-out combined images, an induction-field-in-vision calculation device for calculating the induction field in vision of the laid-out combined images that are input to the image-laid-out input device and obtaining an equipotential line from the calculated induction field in vision, and a layout-evaluation device for evaluating the layout quality based on the equipotential line obtained by the induction-field-in-vision calculation. The layout-evaluations device can further include a complexity calculation device, and thereby, calculates the complexity of the equipotential line obtained by the induction-field-in-vision calculation device, evaluates the layout quality based on the complexity, and determines which layout is most suitable.

27 Claims, 12 Drawing Sheets

FIG. 3
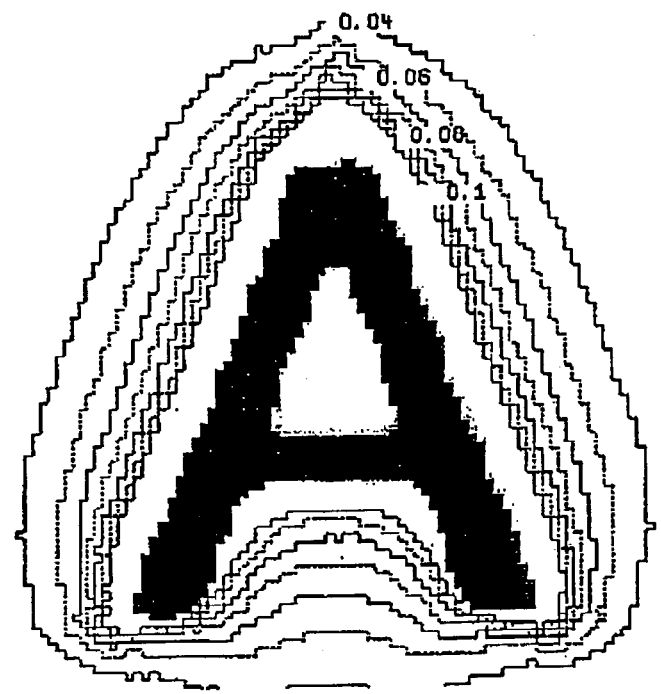
(a)
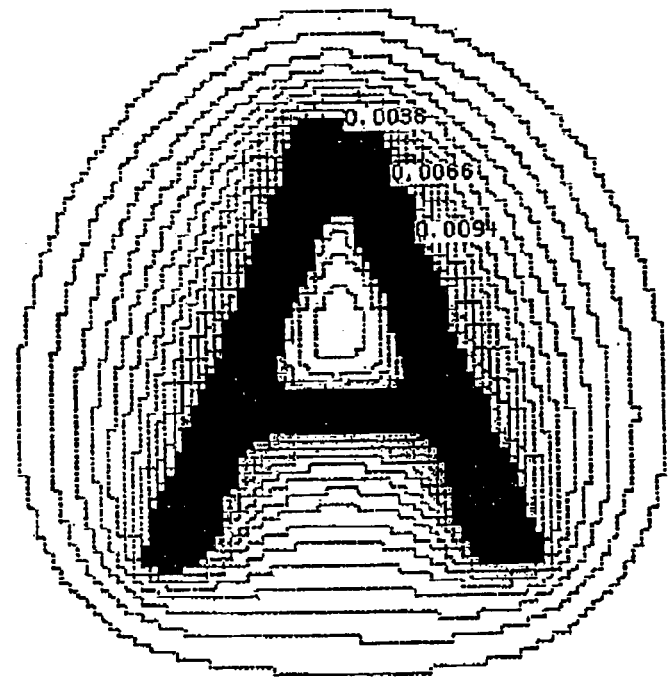
(b)

FIG. 8
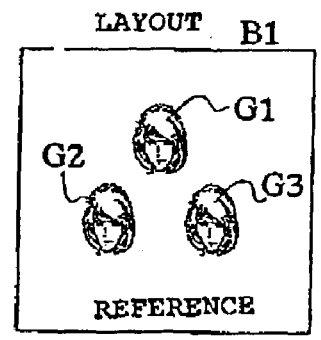
(a) LAYOUT B1 REFERENCE
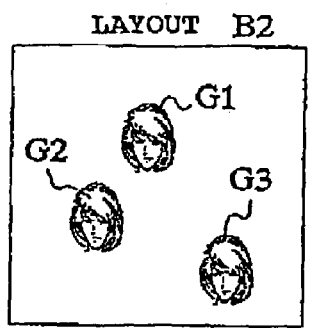
(b) LAYOUT B2
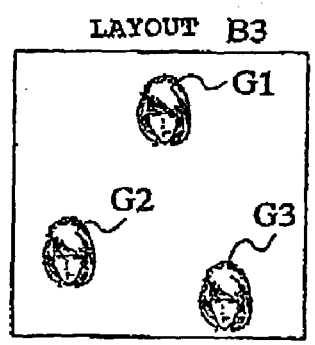
(c) LAYOUT B3
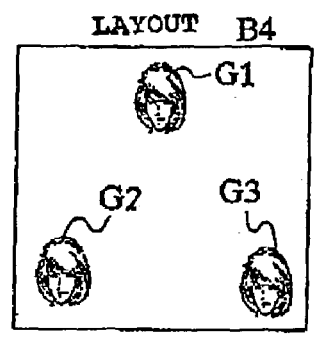
(d) LAYOUT B4
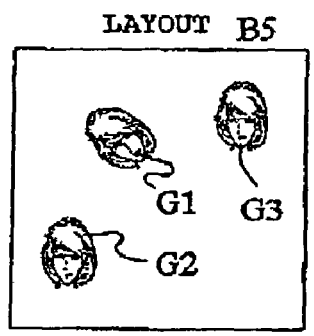
(e) LAYOUT B5
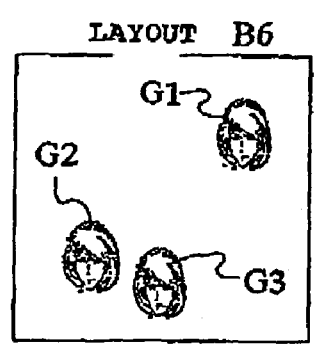
(f) LAYOUT B6

FIG. 12

$$M_p = \frac{1}{n} \sum_{i}^{n} \frac{1}{r_i} \qquad (1)$$

IMAGE-LAYOUT EVALUATION METHOD, IMAGE-LAYOUT EVALUATION SYSTEM, AND IMAGE-LAYOUT-EVALUATION-PROCESSING PROGRAM

BACKGROUND OF THE INVENTION

1. Field of Invention

The present invention relates to an image-layout evaluation method, an image-layout evaluation system, and an image-layout-evaluation-processing program that are provided for evaluating the layout of text, a photograph, a picture, a drawing, and so forth, and thereby achieving a layout that is clear and easy to understand.

2. Description of Related Art

Presently, for displaying an image including text, a photograph, a picture, and a drawing in a limited display area, such as the display screen of an information apparatus, a signboard, or a poster, it can be important to perform layout for making the image clear and easy to understand for many people. Currently, such layout can often be performed by an expert designer.

As for a text string, there are specifications, such as typography, for printing (e.g., JIS X 4051). Perfect automatization of the text string has not been accomplished, even though such automatization is in an advanced state. Therefore, it can be possible to perform layout reasonably. However, it is difficult to determine the layout of a general image including, not only a character, but also a photograph, a picture, and a drawing mechanically without the involvement of a person. Particularly, when the layout of the image includes a plurality of elements so that the photograph, the picture, the drawing, and so forth are included in the text string, such a layout must be determined by the expert designer. Otherwise, the layout often becomes unclear and hard to understand.

To this end, a system for automatically making, for example, space of a newspaper by using electronic data is increasingly used. According to such a system, however, electronic data, such as a text or a photograph, is put into a model (a template) that had already been laid out by the designer. If data is forced out of specifications of the model, the layout may collapse. Therefore, the adaptable range is limited. Further, the system requires different templates according to applications, such as a template for a newspaper, or a template for a magazine.

Further, since such templates are made by a designer or the like, the templates are susceptible to the taste of the designer. Therefore, a layout that is made by the template does not always satisfy everyone.

SUMMARY OF THE INVENTION

Accordingly, an object of the present invention can be to perform layout evaluation by quantity when the image including the character, the photograph, the picture, the drawing, and so forth is laid out in the limited display area, and to optimize the layout of the image, which was made by the help of the sensibility and the manual work of a person.

To this end, according to an image-layout evaluation method of the present invention for evaluating the layout of combined images that are displayed according to a layout in a predetermined display area, the laid-out combined images can be set as a predetermined layout, and the induction field in vision of the laid-out combined images can be calculated. An equipotential line is obtained from the calculated induction field in vision, and the layout quality is evaluated based on the shape of the equipotential line.

According to the image-layout evaluation method, when the combined images include text, the text string is indicated by a line and when the combined images include a photograph, a picture, a drawing, and so forth (i.e., images), they are indicated by boxes, and the induction field in vision is calculated.

According to the image-layout evaluation method, a layout that is set by a user at will is set as an initial layout, the equipotential line of the initial layout is obtained, and the layout quality is evaluated from the shape of the equipotential line. The initial layout is gradually modified when the layout is not the most suitable layout, the equipotential line is obtained for each layout, the layout quality is evaluated from the shape of the equipotential line, and the evaluation is performed until the most suitable layout is obtained.

According to the image-layout evaluation method, a template for setting a predetermined layout can be prepared in advance, a layout complying with the template is set as an initial layout, and the equipotential line of the initial layout is obtained. Further, the layout quality can be evaluated from the shape of the equipotential line, the initial layout is gradually modified when the layout is not the most suitable layout, and the equipotential line is obtained for each layout. Then, the layout quality is evaluated from the shape of the equipotential line, and the evaluation is performed until the most suitable layout is obtained.

According to the image-layout evaluation method, when the combined images include a plurality of elements, an attribute that indicates a characteristic required for performing layout is written for each element. The attributes are referred to for obtaining the most suitable layout.

According to the image-layout evaluation method, when an attribute that indicates a characteristic required for performing layout is written for each of the elements, the template can perform layout complying with the attributes.

According to the image-layout evaluation method, processing for evaluating the layout quality from the shape of the equipotential line can include the steps of determining the undulation magnitude of the equipotential line and determining that a layout that has an equipotential line with low undulation magnitude is a good layout.

The undulation magnitude of the equipotential line can be obtained from the complexity of the equipotential line, and the complexity is obtained from the relation between the length of the equipotential line and the area of a plane surrounded by the equipotential line.

When the value of the complexity becomes lower, the complexity becomes lower, and a layout that has the lowest complexity is determined to be the most suitable layout.

An image-layout evaluation system of the present invention for evaluating the layout of combined images that are displayed according to a layout in a predetermined display area can include an induction-field-in-vision calculation unit for calculating the induction field in vision of the laid-out combined images and obtaining an equipotential line from the calculated induction field in vision. The image-layout evaluation system can further have a layout-evaluation unit for evaluating the layout quality based on the equipotential line obtained by the induction-field-in-vision calculation unit. The laid-out combined images are set as a predetermined layout, the induction field in vision of the laid-out combined images is calculated, and an equipotential line is obtained from the calculated induction field in vision. Then, the layout quality is evaluated based on the shape of the equipotential line.

In the image-layout evaluation system, when the combined images include text, the induction-field-in-vision calculation unit indicates a text string by a line. When the combined images includes an image, such as a photograph, a picture, a drawing, and so forth, the induction-field-in-vision calculation unit indicates them by boxes, and calculates the induction field in vision.

In the image-layout evaluation system, a layout that is set by a user at will can be set as an initial layout, the induction-field-in-vision calculation unit obtains the equipotential line of the initial layout, and the layout-evaluation unit evaluates the layout quality based on the shape of the equipotential line. The initial layout is gradually modified when the layout is not the most suitable layout. The equipotential line is obtained for each layout, and the layout quality is evaluated based on the shape of the equipotential line. The evaluation is performed until the most suitable layout is obtained.

In the image-layout evaluation system, a template for setting a predetermined layout is prepared. A layout complying with the template is set as an initial layout, and the induction-field-in-vision calculation unit obtains the equipotential line of the initial layout. The layout-evaluation unit evaluates the layout quality based on the shape of the equipotential line. The initial layout is gradually modified when the layout is not the most suitable layout, and the equipotential line is obtained for each layout. The layout quality is evaluated based on the shape of the equipotential line, and the evaluation is performed until the most suitable layout is obtained.

In the image-layout evaluation system, when the combined images include a plurality of elements, the layout-evaluation unit has an attribute for each element. The attributes indicate characteristics required for performing layout. The evaluation unit refers to the attributes for obtaining the most suitable layout.

In the image-layout evaluation system, when an attribute indicating a characteristic required for performing layout is written for each of the elements, the template can perform layout complying with the attributes.

In the image-layout evaluation system, processing for evaluating the layout quality from the shape of the equipotential line, which is performed by the layout-evaluation unit, can include the steps of determining the undulation magnitude of the equipotential line and determining that a layout that has an equipotential line with low undulation magnitude is a good layout.

The undulation magnitude of the equipotential line can be obtained as the complexity of the equipotential line, and the complexity can be obtained from the relation between the length of the equipotential line and the area of a plane surrounded by the equipotential line. When the value of the complexity becomes lower, the complexity becomes lower, and a layout that has the lowest complexity is determined to be the most suitable layout.

An image-layout-evaluation-processing program of the present invention is provided for evaluating the layout of combined images that are displayed according to a layout in a predetermined display area. The processing program can include the steps of setting the combined images that are laid out as a predetermined layout, calculating the induction field in vision of the laid out combined images, obtaining an equipotential line from the calculated induction field in vision, and evaluating the layout quality based on the shape of the equipotential line.

In the image-layout-evaluation-processing program, when the combined images include text, the text string is indicated by a line, and when the combined images include a photograph, a picture, a drawing, and so forth, they are indicated by boxes, and the induction field in vision is calculated.

In the image-layout-evaluation-processing program, a layout that is set by a user at will is set as an initial layout, the equipotential line of the initial layout is obtained, and the layout quality is evaluated from the shape of the equipotential line. The initial layout is gradually modified when the layout is not the most suitable layout, and the equipotential line is obtained for each layout. The layout quality is evaluated from the shape of the equipotential line, and the evaluation is performed until the most suitable layout is obtained.

In the image-layout-evaluation-processing program, a layout that is set by a user at will is determined as an initial layout. The equipotential line of the initial layout is obtained and the layout quality is evaluated from the shape of the equipotential line. The initial layout is gradually modified when the layout is not the most suitable layout. The equipotential line is obtained for each layout, and the layout quality is evaluated from the shape of the equipotential line. The evaluation can be performed until the most suitable layout is obtained.

In the image-layout-evaluation-processing program, when the combined images include a plurality of elements, an attribute is written for each element. The attributes indicate characteristics required for performing layout. The attributes are referred to for obtaining the most suitable layout. In the image-layout-evaluation-processing program, when an attribute indicating a characteristic required for performing layout is written for each of the elements, the template can perform layout complying with the attributes.

When using a recording medium on which the image-layout-evaluation-processing program is recorded, processing for evaluating the layout quality from the shape of the equipotential line can include the steps of determining the undulation magnitude of the equipotential line and determining that a layout that has an equipotential line with low undulation magnitude is a good layout.

The undulation magnitude of the equipotential line can be obtained as the complexity of the equipotential line, and the complexity can be obtained from the relation between the length of the equipotential line and the area of a plane surrounded by the equipotential line.

When the value of the complexity becomes lower, the complexity becomes lower, and a layout that has the lowest complexity is determined to be the most suitable layout.

Thus, according to the present invention, the induction field in vision for the laid-out combined images is calculated, the equipotential line is obtained from the calculated induction field in vision, and the layout quality is evaluated from the shape of the equipotential line. Therefore, the layout can be evaluated by quantity. By using the evaluation, it becomes possible to optimize the layout automatically. Currently, the layout was made with the involvement and the manual work of a person.

When the induction field in vision is calculated, the text string is indicated by a line, and the photograph, the picture, the drawing, and so forth are indicated by a box. Therefore, the calculation of the induction field in vision is simplified and can be performed at high speed.

The layout quality may be evaluated from the shape of the equipotential line. According to this method, the user sets a layout according to his/her own will, and the layout is used as an initial layout. The initial layout is gradually changed, and an equipotential line is obtained for each layout. The layout quality is evaluated according to the shape of the obtained equipotential lines. Otherwise, the equality of the layout may be evaluated by using another method. According to the method, a template for setting a layout is prepared in advance, and a layout complying with the template is used as an initial layout. The initial layout is gradually changed, and an equipotential line is obtained for each layout. The layout quality is evaluated according to the shape of the obtained equipotential line.

Such methods can be selected depending on how far the processing can be referred to the user side and the system side. The former method has an advantage that the processing performed by the system side can be simplified even though some operating load is placed on the user side. On the other hand, according to the latter method, a rough layout is set for the meantime, and the rough layout is gradually changed until it becomes the most suitable layout. Therefore, the possibility of decreasing the time required for obtaining the most suitable layout becomes high, and the operation load on the user can be significantly reduced. The template may not have been made in a precise manner by the designer or the like, as long as it can perform layout roughly.

When the laid-out combined images includes a plurality of elements, an attribute that indicates a required characteristic for performing layout is written for each of the elements. The attribute is information indicating that this data links with the title, this data links with the main body, which main body this data links with, and so forth. Since the attributes are referred to when the most suitable layout is selected, troubles in the details of the layout are reduced. For example, there are the trouble of a title appearing at a point later than a planned point, the trouble of the text belonging to the title appearing at a distant point, the trouble of a photograph and the text relating thereto that are appearing at distant points, and so forth.

When such an attribute, which indicates the characteristic required for performing layout, is written for each of the elements, the template used as the initial layout makes it possible to perform layout according to the attribute. Accordingly, the occurrence of the above-described troubles in the details of the layout is prevented.

Further, according to the processing of evaluating the layout quality from the shape of the equipotential line, the undulation magnitude of the equipotential line is determined, and the layout that has an equipotential line with low undulation is considered as a good layout. Accordingly, the layout can be properly evaluated by quantity.

The undulation magnitude of the equipotential line is obtained as the complexity of the equipotential line. The complexity is obtained according to the relation between the length of the potential line and the area of a plane surrounded with the equipotential line. Therefore, the undulation magnitude can be determined by simple calculation.

As for the complexity, the lower the value becomes, the lower the complexity becomes. Since the layout with the lowest complexity is considered as the most suitable layout, it becomes possible to perform layout evaluation simply and properly.

BRIEF DESCRIPTION OF THE DRAWINGS

The invention will be described with reference to the accompanying drawings, wherein like numerals reference like elements, and wherein:

FIGS. 3(*a*) and 3(*b*) show examples of the induction field in vision of a character "A", wherein FIG. 3(*a*) shows an example where the induction field in vision is obtained in consideration of the shielding condition, and FIG. 3(*b*) shows another example where the induction field in vision is obtained without consideration of the shielding condition;

FIGS. 8(*a*) to 8(*f*) illustrate examples where three face images are shown according to different layouts (6 types);

FIG. 12 shows expression (1) for obtaining the strength Mp of the induction field at the point P shown in FIG. 1.

DETAILED DESCRIPTION OF PREFERRED EMBODIMENTS

According to modes of the present invention, an image-layout-evaluation method and an image-layout-evaluation system will now be described. Further, the details of processing performed according to an image-layout-evaluation-processing program of the present invention will now be described.

In the present invention, an induction-field-in-vision concept is used for image-layout evaluation for determining the most suitable layout. The induction field in vision will now be described briefly.

The induction field in vision is used as the index of the readability of a text string by performing, e.g., evaluation of the readability of text of the text string.

First, as an example of making an estimate of the induction field in vision of a text image on the basis of knowledge of physiology and psychology, a method of making an estimate of the induction field in vision of a digital text image obtained by electronic techniques will be described.

When the text of the text string is readable, the induction fields surrounding the text are disposed so that they do not interfere with each other as much as possible. More specifically, when the potential value of a closed curve of each induction field in vision, the closed curve surrounding the text, is high, the text is hardly separated from the other text and is not easy to read. Therefore, it is considered that the readability of the text of the text string can be evaluated by quantity with reference to the expansion of the induction field in vision. Incidentally, the induction field in vision is described in "The Psychology of Shape" written by Zensho Yokose (Nagoya University Press Association (1986)) which is incorporated herein in its entirety.

The induction field in vision described in the above paper (hereinafter simply referred to as an induction field) describes a visual phenomenon by considering a "field" that has a fringing effect around a drawing. The reference paper is aimed at a drawing including lines and arcs. Therefore, the induction field of an arbitrary digital image cannot be obtained. Here, a method of calculating the induction field of a digital image of white/black binary values will be described.

Basically, the induction field is equivalent to a Coulomb potential. Therefore, assuming that pixels forming the edge of a pattern are point charges, the distribution of the induction field of the digital image is calculated by using the density of the Coulomb potential due to the point charges.

Figure 1:
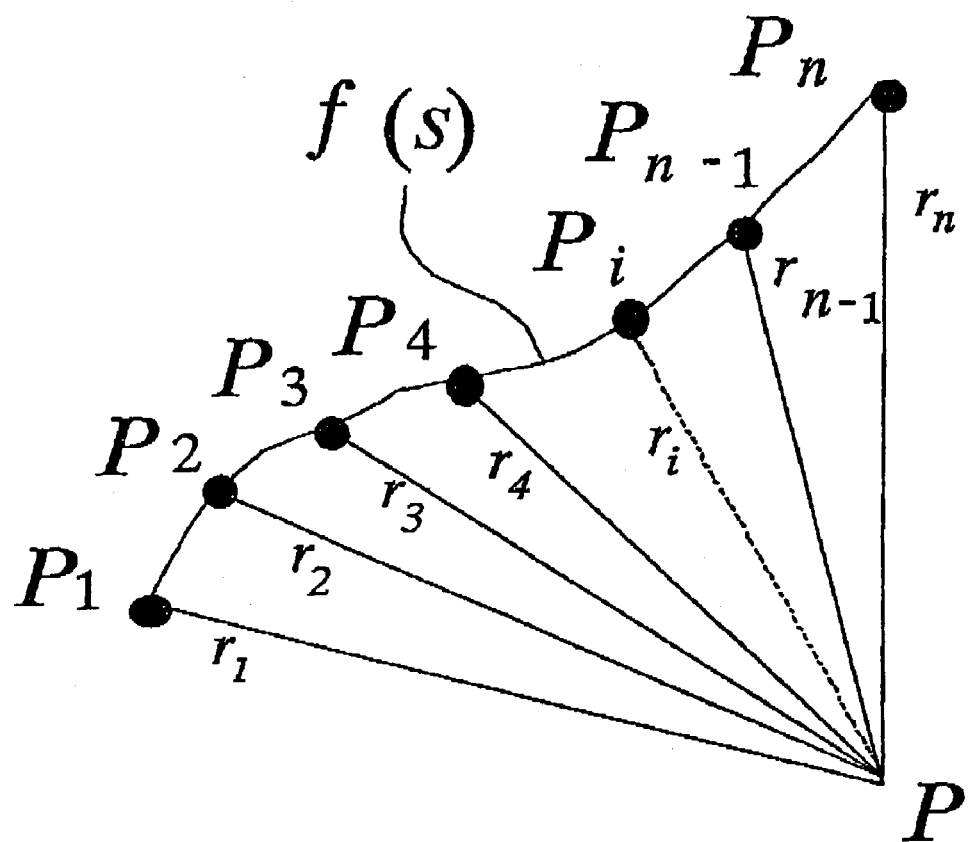
FIG. 1 shows the pixel array of a digital image for illustrating an induction field in vision that is used for the present invention.
Figure 12:
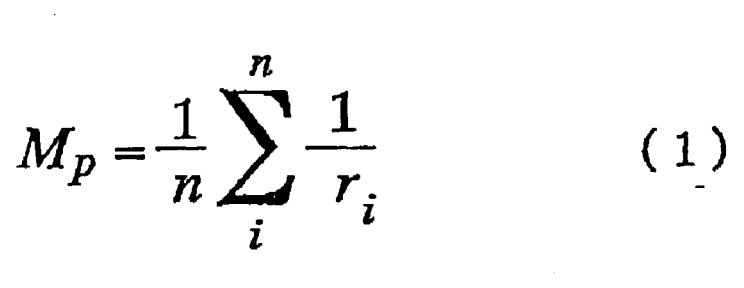

FIG. 1 illustrates the pixel array of a digital image. As shown in FIG. 1, an induction field is formed at an arbitrary point P by the curve f(s) that is formed by a sequence of n points. The curve f(s) corresponds to the line segment of a drawing, or the edge of a picture. On the assumption that points p1, p2, ..., pi, ..., pn has +1 electric charge, a scan is performed from the point P over the curve f(s). When the n points including p1, p2, ..., pi, ..., pn, forming the curve f(s) are found, and the distances to the points, which are found on the curve f(s) by the scan, are ri, the strength Mp of the induction field at the point P is defined as shown by expression (1) in FIG. 12.

Figure 2:
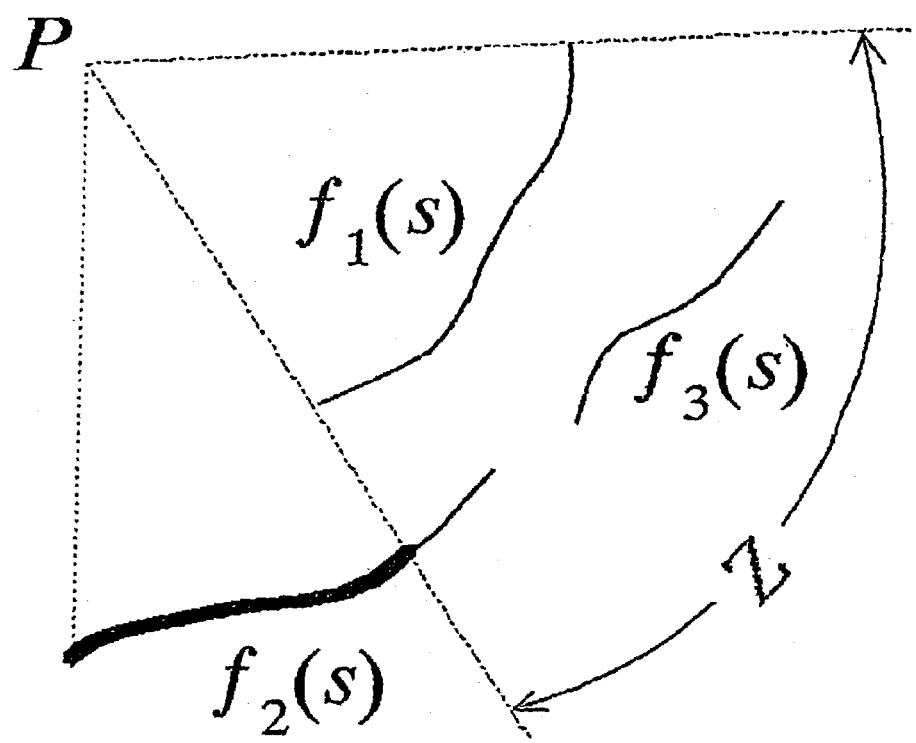
FIG. 2 illustrates the shielding condition when the magnitude of the induction field in vision is calculated.

By using expression (1), the induction field of an arbitrary digital image can be obtained. When there is a plurality of curves, the strength of the induction field at the point P is obtained by calculating the sum of the induction fields made by the curves at the point P. Expression (1) can be applied only to the segment from which the point P can be seen. In FIG. 2, curves f3(S) and some parts of f2(S) occluded by f1(S) do not contribute in creating the induction field. In other words, the sum for the area Z that cannot be seen from the point P because it is shielded by the curve f1(s) is not calculated. In the example of FIG. 2, the sum of the whole curve f3(s) and part of the curve f2(s) is not calculated. This is referred to as the shielding condition.

FIG. 3(a) shows exemplary induction fields calculated by using expression (1) for a text "A". Thin lines L that are distributed around the character "A" shown in FIG. 3(a) like contour lines of a map are equipotential lines of the induction fields. The magnitude of the induction fields becomes lower as it approaches the outside from the central, and gradually approaches zero.

The characteristic of the shape and the magnitude of the distribution of the induction fields in FIG. 3(a), particularly the characteristic of the distribution, which becomes sharper than others when it is near the top of the "A", matches the result of a psychology experiment for the distribution of an induction field near an angle of a drawing such as a quadrangle or a triangle as described in the reference paper.

FIG. 3(b) shows an exemplary induction field provided on the assumption that all the pixels have +1 electric charge 1 without the shielding condition (the sum in the area Z, which cannot be seen from the arbitrary point P, is not calculated). The distribution of the induction fields becomes round overall, which is different from the result of the psychology experiment described in the reference paper. Thus, the shielding condition is important for characterizing the induction field.

As has been described, the induction field of a character can be obtained. Incidentally, there are exemplary technologies using the induction field in vision, such as "Michihiro Nagaishi: "Readable Proportional Display for Japanese using Induction Field in Vision", THE JOURNAL OF THE INSTITUTE OF IMAGE INFORMATION AND TELEVISION ENGINEERS, Vol. 52, No. 12, pp. 1865–1872 (1998)" (hereinafter referred to as a first paper) and "Masazumi Miyoshi, Yoshifumi Shimojio, Hiroaki Koga, Ken Ideguchi: Design of Text Arrangement on the basis of Sensibility by using Induction Field in Vision Theory", IEICE TRANSACTIONS, 82-A, 9, 1465–1473 (1999)" (hereinafter referred to as a second paper). Both the first and second papers are incorporated herein by reference in their entirety.

When combined images including a character, a photograph, a picture, a drawing, and so forth are displayed in a predetermined limited display area, the present invention performs layout evaluation of the layout of the images by using the above-described induction field in vision so that the layout becomes the most suitable layout. By using such layout evaluation, the present invention achieves automatized optimization of the layout. To date, optimization of a layout was performed with the involvement and the manual work of a person.

According to the present invention, when the layout quality is evaluated, the laid-out combined images are considered subjects for induction-field calculation. Then, the induction field of the images is calculated, and the layout quality is evaluated based on the shape of the equipotential line that is obtained by the calculation. The modes of the present invention will now be described.

Figure 4:
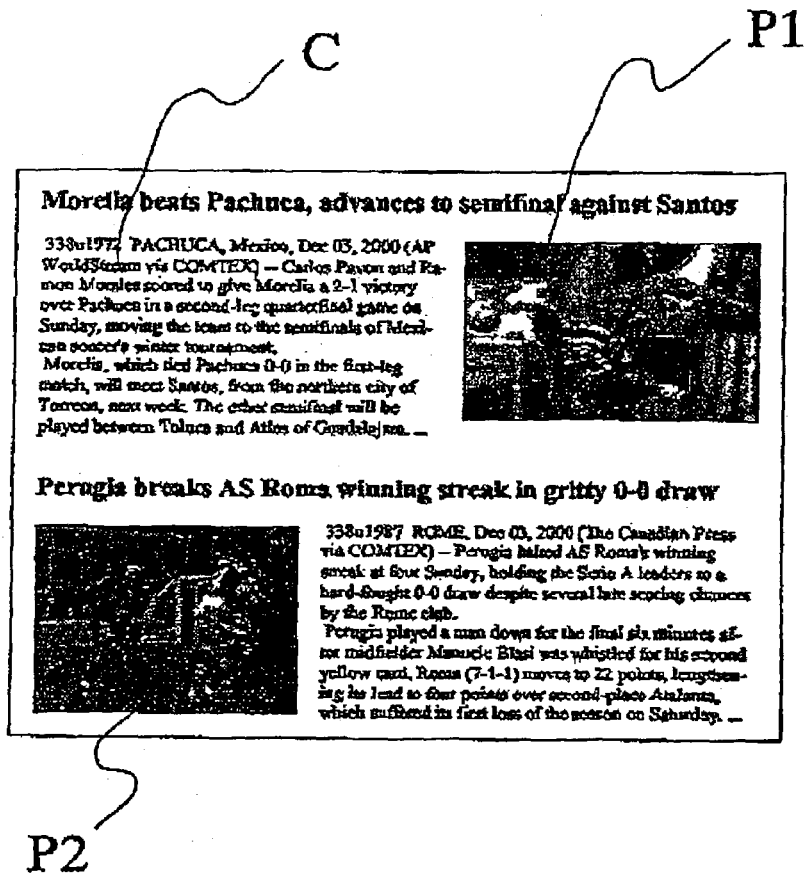
FIG. 4 illustrates an image that is a part of a newspaper story as an exemplary reference layout.

As shown in FIG. 4, the laid-out combined images include text strings and pictures. The images shown in FIG. 4 are a part of a newspaper story and include text strings C and photographs P1 and P2. The layout shown in FIG. 4 is designed by an expert designer for a newspaper. Everyone clearly and easily can understand the layout.

Figure 5:
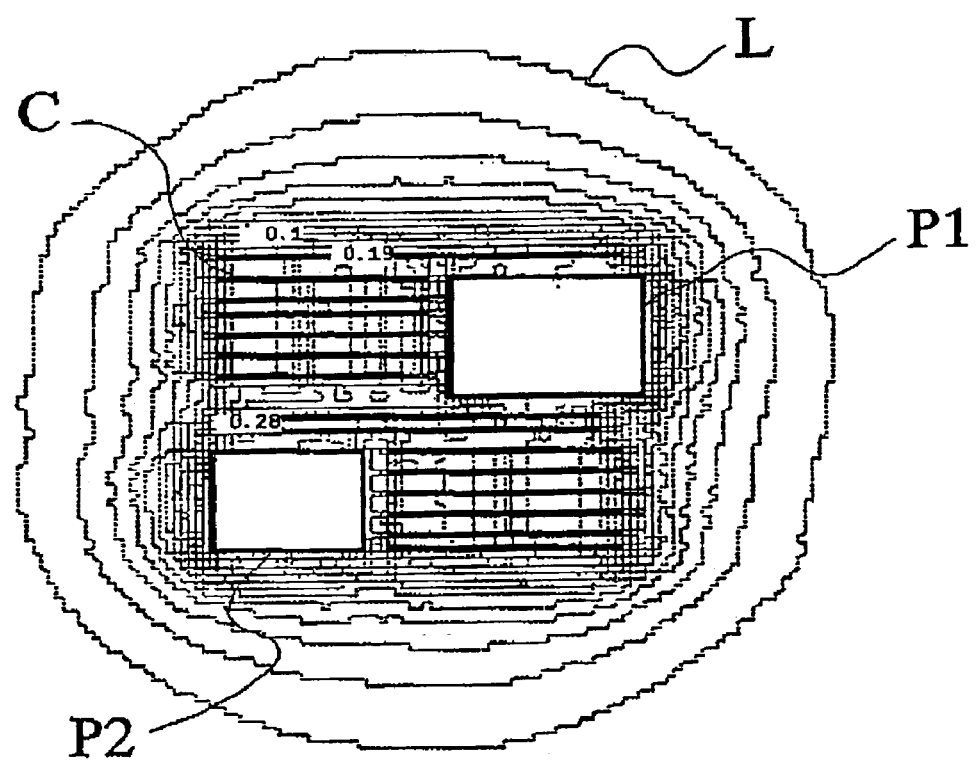
FIG. 5 illustrates equipotential lines obtained from induction fields of the image shown in FIG. 4, the induction fields being calculated for text strings indicated by simple lines, and for photographs that are simply indicated by rectangular boxes.

As shown in FIG. 4, when the induction fields of the combined images, which are laid out in a limited display area, are calculated by using expression (1), equipotential lines L shown in FIG. 5 are drawn according to the calculated induction fields. Incidentally, for calculating the induction fields of the whole laid-out information, the text strings C shown in FIG. 4 are indicated by simple lines, and the shape of the photographs P1 and P2 are indicated by rectangular boxes.

This is because the layout is determined by the size of the elements and the positional relation therebetween, and the elements can be simplified. When the induction field of the simplified elements is calculated, and the equipotential line is drawn corresponding to the calculated induction field, the equipotential line becomes the equipotential line of the whole layout.

The layout shown in FIG. 4 is designed by the expert designer. The layout is clear and easy to understand. The equipotential lines L, which are obtained from the images that are laid out in such a manner, have low undulation and are round.

Accordingly, it becomes possible to calculate the induction field of the laid-out combined images, and determine the layout quality of the images corresponding to the shape of the equipotential lines, which are obtained from the induction fields. That is to say, when the degree of the undulation of the obtained equipotential lines is determined, it becomes possible to evaluate the layout quality.

Therefore, according to the mode of the present invention, the degree of the undulation of the equipotential line is calculated as the complexity, and the complexity is used as the index for evaluating the layout quality of the images. That is to say, when the undulation of the equipotential line becomes smaller, the complexity becomes lower. When the undulation of the equipotential lines becomes larger, the complexity becomes higher. When the complexity of No. i equipotential line is indicated by reference characters Ci, the complexity can be obtained by:

$$Ci = Li^2 / Si \quad (2)$$

Further, in expression (2), reference characters Li indicate the length of No. i equipotential line and reference characters Si indicate the area of a plane surrounded with No. i equipotential line. The length Li of No. i equipotential line can be considered as the number of dots forming the potential line. The area Si of the plane surrounded with No. i equipotential line can be considered as the number of dots existing in the plane surrounded by No. i equipotential line.

According to expression (2), when the equipotential line, which is drawn by the calculated induction field of the laid-out combined images, becomes longer, (when the undulation becomes heavier), the value of the complexity Ci becomes higher. Conversely, when the undulation of the equipotential line becomes compacter, the complexity Ci becomes lower.

Figure 6:
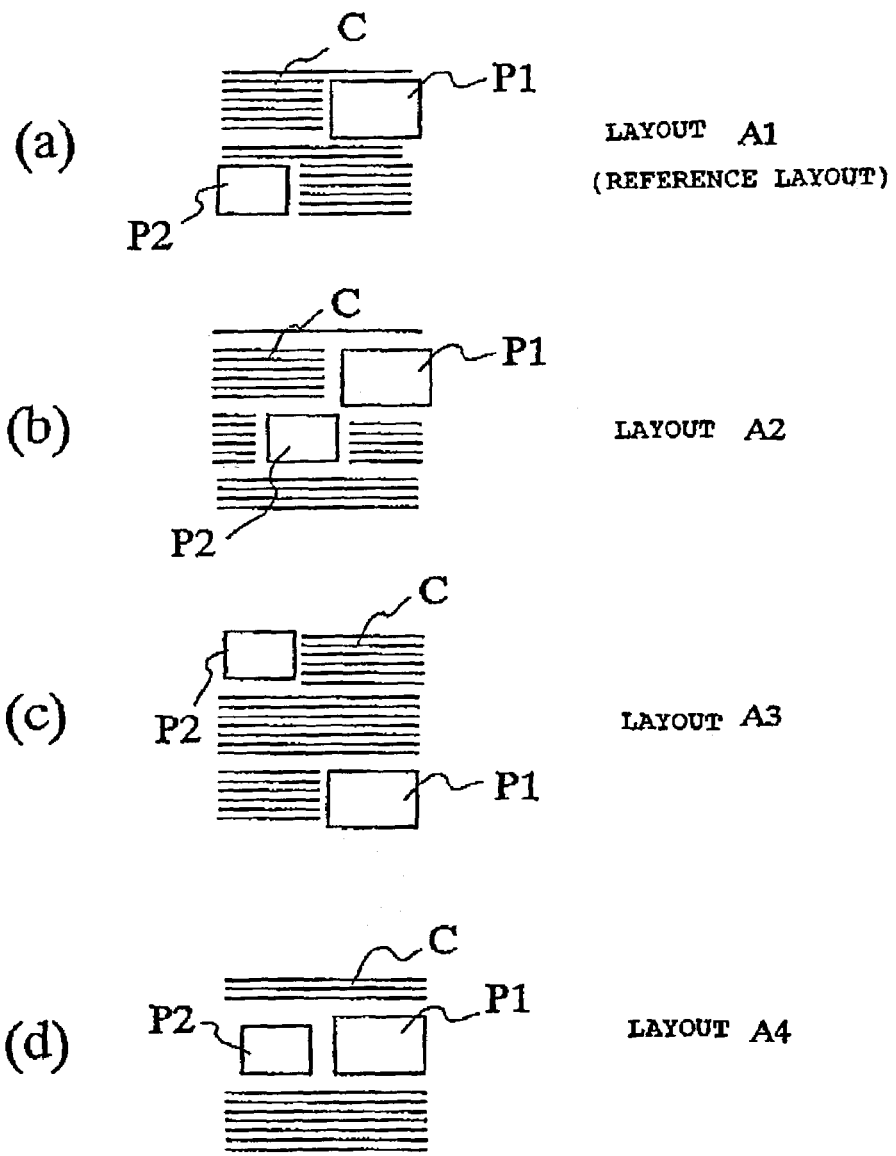
FIGS. 6(*a*) to 6(*d*) illustrate the reference layout shown in FIG. 4 and layouts that are obtained by modifying the reference layout in various ways.

In FIG. 6, the combined images shown in FIG. 4 are laid out in various ways. Here, the complexity of the units of images is calculated. In FIG. 6, the text strings C are indicated by simple lines, and the photographs P1 and P2 are simply indicated by rectangular boxes as in the case of FIG. 5.

FIG. 6(a) shows a layout that is the same as the one shown in FIG. 4 (referred to as a layout A1). FIG. 6(b) shows a layout where the photograph P2 shown in FIG. 4 is placed among the text strings (referred to as a layout A2). FIG. 6(c) shows a layout where the photograph P1 is placed at the lower right and the photograph P2 is placed at the upper left (referred to as a layout A3). FIG. 6(d) shows a layout where the two photographs P1 and P2 are placed among the text strings (referred to as a layout A4).

Figure 7:
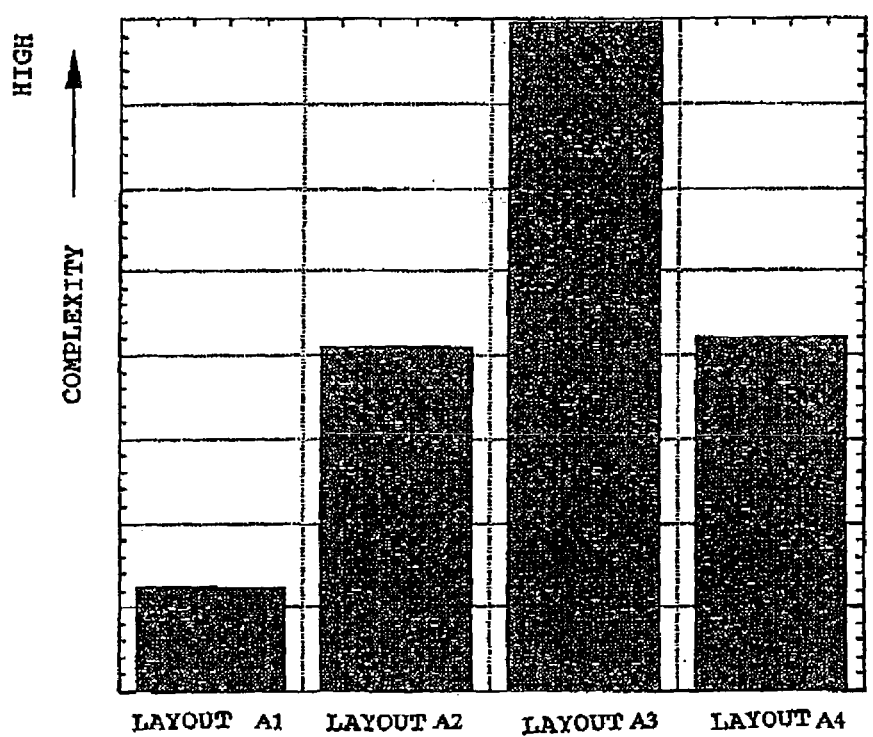
FIG. 7 illustrates the complexity of the layouts shown in FIGS. 6(*a*) to 6(*d*)

First, the induction field is calculated for each layout. An equipotential line (No. i potential line) is drawn by the calculated induction field. From the equipotential line, the complexity is calculated by using expression (2). FIG. 7 shows the result of the calculation. In FIG. 7, the layouts A1 to A6 are shown along the horizontal axis, and the complexity calculated for the layouts A1 to A6 is shown along the vertical axis.

As shown in FIG. 7, the complexity of the layout A1 (referred to as a reference layout A1) is lowest. The layout A1 is made by a designer, and is clear and easy to understand. The complexity of the other three layouts A2, A3, and A4 is high compared with that of the reference layout A1. Particularly, in this example, the complexity of the layout A3 is highest.

This is because the induction field that is calculated from the reference layout A1 has a small undulation, and the equipotential lines that are calculated from the other three layouts A2 to A4 have a large undulation.

Thus, as in the above-descried example, a part of a newspaper story (which often includes a text string, a photograph, and so forth) is considered as laid-out combined images, and the layout of the combined images is evaluated. However, the laid-out combined images can include general images as shown in FIG. 8. Further, the laid-out combined images can be subjected to the same evaluation.

FIGS. 8(a) to 8(f) illustrate examples where three facial images G1, G2, and G3 are shown according to different layouts B 1 to B6. As has been described, each of the layouts B1 to B6 shown in FIGS. 8(a) to 8(f) is considered to be combined images. Then, the induction fields are calculated for the combined images, and equipotential lines are drawn from the calculated induction fields. For each equipotential line, the complexity is calculated by using expression (2). FIGS. 9(a) to 9(f) show the result of the calculation. Of these layouts B1 to B6, many people consider that the layout B1 (referred to as a reference layout B1) is the most stable and suitable layout.

Figure 9:
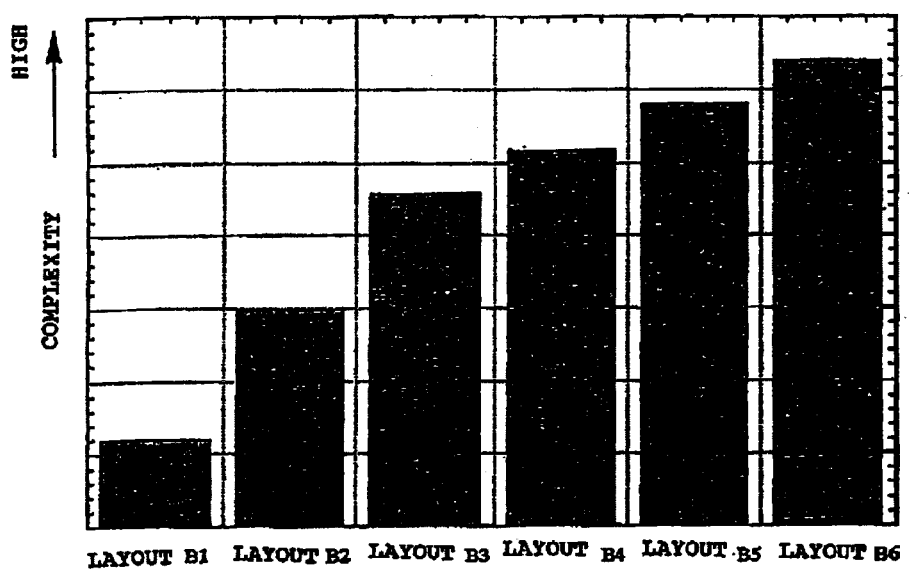
FIG. 9 illustrates the complexity of the layouts shown in FIGS. 8(*a*) to 8(*f*)

In FIG. 9, the layouts B1 to B6 are shown along the horizontal axis, and the complexity calculated for the layouts B1 to B6 is shown along the vertical axis. According to FIG. 9, the complexity of the reference layout B1 is the lowest. The layout B1 is clear and easy to understand. The complexity of the other five layouts B2 to B6 is relatively high compared with that of the reference layout B1.

This is because the equipotential line calculated from the reference layout B1 has a small amount of undulation, and the equipotential lines (not shown) that are calculated from the other five layouts have a relatively larger amount of undulation and complex shape.

As has been described, there is a correspondence between the beauty and the complexity of the layout. Accordingly, by using the complexity, the layout quality can be evaluated by quantity.

Figure 10:
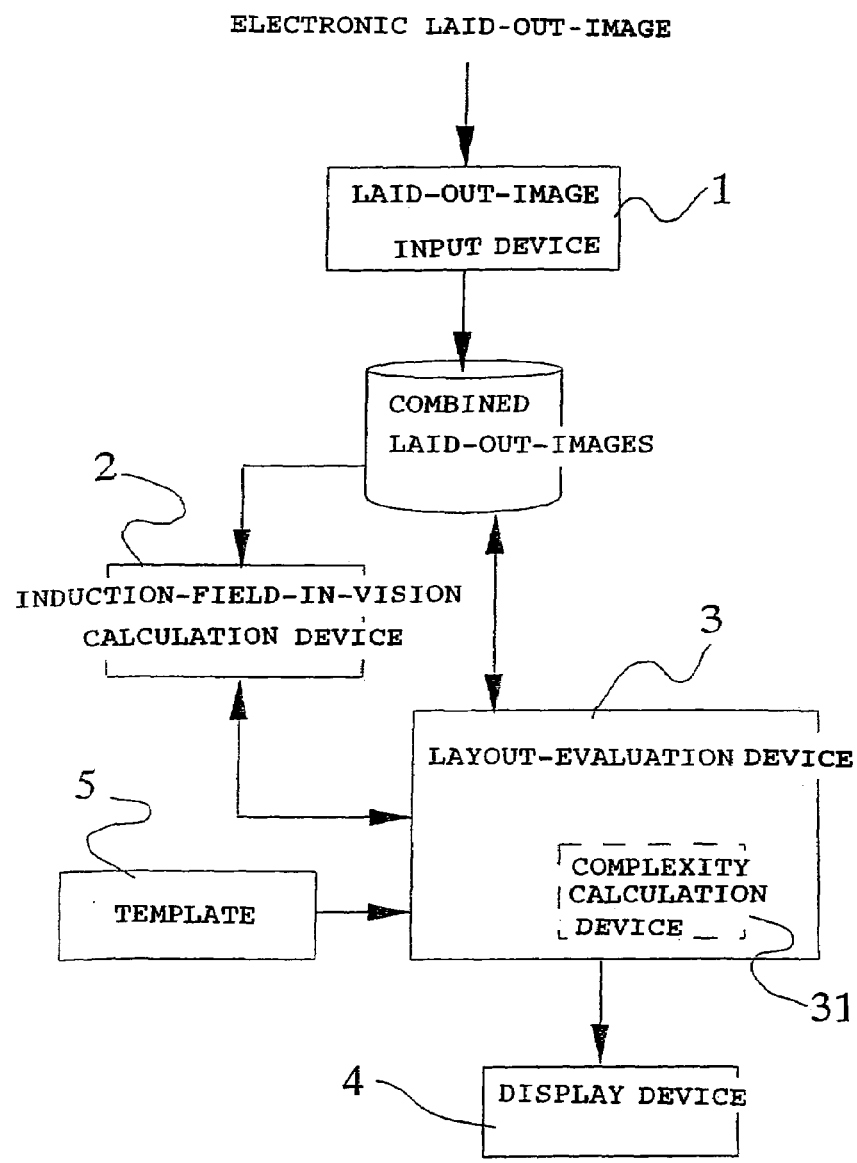
FIG. 10 illustrates the schematic configuration of an information-evaluation system according to an exemplary mode of the present invention.

FIG. 10 illustrates the schematic configuration of an image-layout-evaluation system of the present invention. The system calculates the above-described induction field, obtains the equipotential line from the calculated induction field, evaluates the layout quality based on the shape of the equipotential line, and thereby determines which layout is most suitable.

As shown in FIG. 10, the information-layout-evaluation system can include an image-laid-out input device 1 for inputting a laid-out electronic image, induction-field-in-vision calculation device 2 for calculating the induction field in vision of laid-out combined images that are displayed in a limited display area of images that had been input to the image-laid-out input device 1 and obtaining an equipotential line from the calculated induction field in vision, layout-evaluation device 3 for evaluating the layout quality based on the equipotential line obtained by the induction-field-in-vision calculation device 2 and determining which layout is most suitable, and display device 4 that can display the state of processing performed by the layout-evaluation device 3.

Further, the information-layout-evaluation system may include a template 5 that can set a rough layout in addition to the above-described template, which was made by the designer. Any template can be used as the template 5 as long as it can perform layout roughly.

The layout-evaluation device 3 determines the layout quality based on the undulation state of the equipotential line obtained by the induction-field-in-vision calculation device 2, and performs processing of determining which layout is the most suitable layout. When the processing is performed according to this mode, the above-described complexity is used.

The layout-evaluation device 3 can include complexity-calculation device 31, and thereby calculates the complexity of the equipotential line obtained by the induction-field-in-vision calculation device 2 by using expression (2). The layout-evaluation device 3 evaluates the layout quality based on the complexity and determines which layout is the most suitable layout.

As the method of determining which layout is the most suitable layout for data that is to be processed by using the above-described system, two methods will now be described.

According to one method, a user sets a layout for laid-out combined images (that can include text, a photograph, and so forth) according to their own will (referred to as an initial layout). The induction-field calculation device 2 calculates the induction field for the initial layout and obtains the equipotential line of the calculated induction field. The layout-evaluation device 3 performs processing of obtaining the complexity for the initial layout. After that, the initial layout is gradually modified. The processing of obtaining an equipotential line is performed for each of the layouts. Then, the most suitable layout is selected from the layouts (referred to as the first method).

For performing such processing when the laid-out combined images include a plurality of elements, an attribute indicating a characteristic that is required for doing layout is written for each of the elements (information indicating that this data links with the title, this data links with the main body, which main body this data links with, and so forth). The attributes are referred to for selecting the most suitable layout.

Such attributes are provided as limitations to prevent problems (such as the problems of a title appearing at a point later than a planned point, the problem of the text belonging to the title appearing at a distant point, the problem of a photograph and the text relating thereto that are appearing at distant points, and so forth). After referring to the attributes, it is determined whether or not the layout is most suitable.

As has been described, in the first method, the layout, which was set by the user at will, is used as the initial layout, and the initial layout is gradually modified. According to this method, even though the processing performed by the system is simple, various layouts are required to be made tentatively, and evaluation is performed for each layout. Therefore, much time is required, which becomes a problem. To deal with the problem, there is a method described below (referred to as a second method).

According to the second method, the rough template 5 (the template 5 shown in FIG. 10) for setting some layout may be provided in advance. A layout that is made according to the template is used as an initial layout, and the induction-field calculation device 2 calculates the induction field of the initial layout. An equipotential line is obtained from the calculated induction field, and the layout-evaluation device 3 obtains the complexity for the initial layout. After that, the initial layout is gradually modified, and the processing of obtaining an equipotential line is performed for each layout. Then, the most suitable layout is selected from the layouts.

Further, when the laid-out combined images includes a plurality of elements as in the above-described case, an attribute indicating a characteristic that is required for doing layout is written for each element. The attributes are referred to for selecting the most suitable layout.

Figure 11:
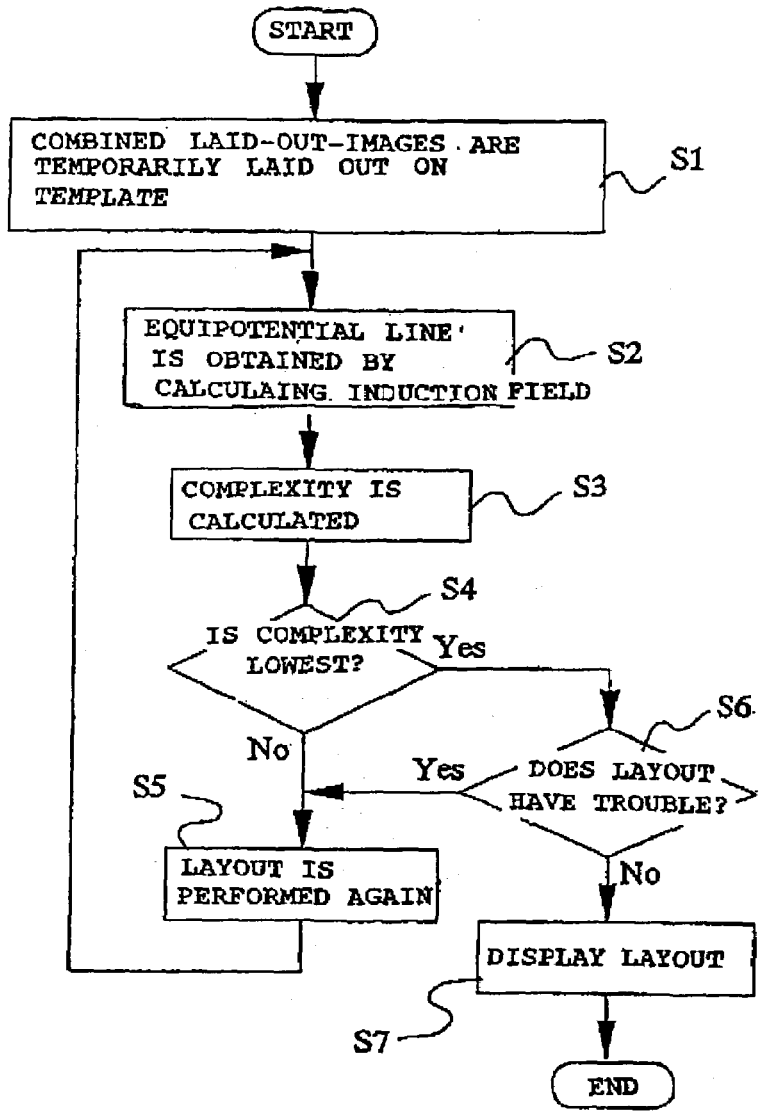
FIG. 11 is a flowchart illustrating steps of an exemplary image-layout-evaluation processing according to another mode of the present invention.

The second method will now be described with reference to the flowchart shown in FIG. 11.

First, on the prepared template 5, which can perform layout roughly, combined images are laid out temporarily (step s1). Then, the induction-field-in-vision calculation means 2 calculates the induction field, and thereby obtains the equipotential line (step s2). The layout-evaluation means 3 calculates the complexity (step s3). It is determined whether or not the complexity indicates the most suitable value (the lowest value) (step s4). When it is determined that the value is not the most suitable value (the lowest value), the images are laid out again. That is to say, the initial layout is slightly modified (step s5). Then, the processing goes back to step s2 and the above-described processing is performed.

When the value of the complexity becomes most suitable after the above-described layout processing is repeated several times, it is determined whether or not the layout has a problem (as described above, the problem of a title appearing at a point later than a planned point, the problem of the text belonging to the title appearing at a distant point, the problem of a photograph and the text relating thereto that are appearing at distant points, and so forth) (step s6). If there are no problems, it is displayed as such (step s7), and the processing is terminated. However, if the layout has such a problem, the processing goes back to step s5 and layout is performed again.

Thus, according to the second method, the template 5 temporarily sets the rough layout. Then, the rough layout is used as the base layout, and is modified gradually until the most suitable template is obtained. Accordingly, the time that is required to obtain the most suitable layout can be significantly reduced.

As described above, the template 5, which is used here, is a rough template that shows a very basic frame. For example, the user may make a temporary layout on the screen by dragging and dropping a mouse.

Further, as has been described, the attribute indicating the characteristic that is required for doing layout is written for each element forming the combined images (information indicating that this data links with the title, this data links with the main body, which main body this data links with, and so forth). The attributes are referred to when the most suitable layout is selected. In such a case, the prepared template can perform layout complying with the attributes. First, each element is mechanically put into the template, and the template is optimized according to the complexity obtained by the induction field.

Subsequently, it becomes possible to reduce the above-described trouble in the details of the layout.

It should be understood that the present invention is not limited to the above-described modes, but may be applied to variously modified modes without departing from the spirit and the scope thereof. For example, according to the above-described modes, when the complexity is obtained, the complexity of some equipotential line is obtained, and the layout is evaluated from the magnitude of the complexity. However, it may be arranged that complexity be obtained for each of a plurality of equipotential lines. For example, the average of the obtained complexity may be obtained, and the layout may be evaluated according to the magnitude of the average complexity. By using various indexes, it becomes possible to perform better evaluation.

In the above-described modes, the undulation of the equipotential line is determined by the complexity, which is expressed by equation (2). However, the undulation of the equipotential line can be obtained by another technique instead of using equation (2).

The present invention can be widely used for performing layout for an image using electronic data. For example, the present invention can be used for a case where an automatic distribution system of, e.g., a newspaper that uses electronic data determines the layout, a case where layout of a webpage is performed, a case where layout is performed based on HTML, and a case where layout of the teletext on digital television by the broadcasting satellite is performed again. Further, the present invention can be applied for a layout for making a poster, a signboard, and so forth.

Further, the present invention provides a processing program wherein processing steps for achieving the above-described present invention are written. The processing program can be stored on a recording medium, such as a floppy disc, an optical disc, and a hard disc. The present invention includes the recording medium on which the processing program is recorded. Further, it may be arranged that the processing program can be obtained from a network.

As has been described, according to the present invention, the induction field in vision is calculated for the laid-out combined images, the equipotential line is obtained by the calculated induction field in vision, and the layout quality is evaluated according to the shape of the equipotential line. Therefore, the layout evaluation by quantity can be achieved, whereby layout of information that was performed with the help of the feeling and the manual work of a person can be automatically optimized.

When the laid-out combined images include the plurality of elements, the attribute indicating the characteristic that is required for doing layout is written for each of the elements (information indicating that this data links with the title, this data links with the main body, which main body this data links with, and so forth). The attributes are referred to for selecting the most suitable layout. Therefore, it becomes possible to reduce the problems (such as the problem of the title appearing at the point later than the planned point, the problem of the text belonging to the title appearing at the distant point, the problem of the photograph and the text relating thereto that are appearing at distant points, and so forth) in the laid-out details.

According to the processing of evaluating the layout quality from the shape of the equipotential line, the undulation degree of the equipotential line is determined. When the undulation of the equipotential line of a layout is low, the layout is determined as a good layout. Thus, the layout can be properly evaluated by quantity. The undulation degree of the equipotential line is obtained as the complexity of the equipotential line, and the complexity is obtained from the relation between the length of the equipotential line and the area of the plane surrounded with the equipotential line. Therefore, the undulation degree of the equipotential line can be determined by simple calculation, whereby the layout can be properly evaluated by quantity.

The invention claimed is:

1. An image-layout evaluation method for evaluating a layout of combined images that are displayed according to a layout in a predetermined display area, comprising:
   setting as a predetermined layout the laid-out combined images;
   calculating the induction field in vision of the laid-out combined images;
   obtaining an equipotential line from the calculated induction field in vision; and
   evaluating the layout quality based on a shape of the equipotential line.

2. An image-layout evaluation method according to claim 1 wherein, when the combined images include text, the text string is indicated by a line and when the combined images include an image, they are indicated by boxes, and the induction field in vision is calculated.

3. An image-layout evaluation method according to claim 1, wherein a layout that is set by a user at will is set as an initial layout, the equipotential line of the initial layout is obtained, the layout quality is evaluated from the shape of the equipotential line, the initial layout is gradually modified, the equipotential line is obtained for each layout, and the layout quality is evaluated from the shape of the equipotential line, then the most suitable layout is selected from the layouts.

4. An image-layout evaluation method according to claim 1, wherein a template that sets a predetermined layout is prepared in advance, a layout complying with the template is set as an initial layout, the equipotential line of the initial layout is obtained, the layout quality is evaluated from the shape of the equipotential line, the initial layout is gradually modified, the equipotential line is obtained for each layout, and the layout quality is evaluated from the shape of the equipotential line, then the most suitable layout is selected from the layouts.

5. An image-layout evaluation method according to claim 3, wherein when the combined images include a plurality of elements, an attribute that indicates a characteristic required for performing layout is written for each element, and the attributes are referred to for obtaining the most suitable layout.

6. An image-layout evaluation method according to claim 4, wherein when an attribute that indicates a characteristic required for performing layout is written for each of the elements, the template can perform layout complying with the attributes.

7. An image-layout evaluation method according to claim 1, wherein processing for evaluating a layout quality from the shape of the equipotential line comprises:
   determining an undulation magnitude of the equipotential line; and
   determining that a layout that has an equipotential line with low undulation magnitude is a good layout.

8. An image-layout evaluation method according to claim 7, the undulation magnitude of the equipotential line being obtained from a complexity of the equipotential line and the complexity is obtained from a relation between a length of the equipotential line and an area of a plane surrounded by the equipotential line.

9. An image-layout evaluation method according to claim 8, wherein when a value of the complexity becomes lower, the complexity becomes lower, and a layout that has a lowest complexity is determined to be the most suitable layout.

10. An image-layout evaluation system for evaluating the layout of combined images that are displayed according to a layout in a predetermined display area, comprising:
    an induction-field-in-vision calculation device that calculates an induction field in vision of laid-out combined images and obtains an equipotential line from the calculated induction field in vision; and
    layout-evaluation device that evaluates a layout quality based on an equipotential line obtained by the induction-field-in-vision calculation device,
    the laid-out combined images being set as a predetermined layout, the induction field in vision of the laid-out combined images being calculated, an equipotential line being obtained from the calculated induction field in vision, and the layout quality being evaluated based on the shape of the equipotential line.

11. An image-layout evaluation system according to claim 10, wherein, when combined images include text, the induction-field-in-vision calculation means device indicates a text string by a line and when the combined images include an image, the induction-field-in-vision calculation device indicates them by boxes, and calculates an induction field in vision.

12. An image-layout evaluation system according to claim 10, wherein a layout that is set by a user at will is set as an initial layout, the induction-field-in-vision calculation device obtains the equipotential line of the initial layout, the layout-evaluation device evaluates the layout quality based on the shape of the equipotential line, the initial layout is gradually modified, the equipotential line is obtained for each layout, and the layout quality is evaluated from the shape of the equipotential line, then the most suitable layout is selected from the layouts.

13. An image-layout evaluation system according to claim 10, wherein a template that sets a predetermined layout is prepared, a layout complying with the template is set as an initial layout, the induction-field-in-vision calculation device obtains the equipotential line of the initial layout, the layout-evaluation device evaluates the layout quality based on the shape of the equipotential line, the initial layout is gradually modified, the equipotential line is obtained for each layout, and the layout quality is evaluated from the shape of the equipotential line, then the most suitable layout is selected from the layouts.

14. An image-layout evaluation system according to claim 12, wherein, when combined images include a plurality of elements, the layout-evaluation device has an attribute for each element, the attribute indicating a characteristic required for performing layout, and refers to the attributes for obtaining the most suitable layout.

15. An image-layout evaluation system according to claim 13, wherein, when an attribute that indicates a characteristic required for performing layout is written for each element, the template can perform layout complying with the attributes.

16. An image-layout evaluation system according to claim 10, wherein processing for evaluating the layout quality from the shape of the equipotential line, which is performed by the layout-evaluation device, comprises:
   determining an undulation magnitude of the equipotential line; and
   determining that a layout that has an equipotential line with low undulation magnitude is a good layout.

17. An image-layout-evaluation system according to claim 16, the undulation magnitude of the equipotential line being obtained as a complexity of the equipotential line and the complexity being obtained from relation between a length of the equipotential line and an area of a plane surrounded by the equipotential line.

18. An image-layout-evaluation system according to claim 17, wherein, when the value of the complexity becomes lower, the complexity becomes lower, and a layout that has a lowest complexity is determined to be the most suitable layout.

19. An image-layout evaluation-processing program stored on a computer readable medium for evaluating a layout of combined images that are displayed according to a layout in a predetermined display area comprising:
   setting a laid-out combined images as a predetermined layout;
   calculating an induction field in vision of the laid-out combined images;
   obtaining an equipotential line from the calculated induction field in vision; and
   evaluating a layout quality based on a shape of the equipotential line.

20. An image-layout-evaluation-processing program according to claim 19, wherein, when the combined images include text, a text string is indicated by a line and when the combined images include, an image, they are indicated by boxes, and the induction field in vision is calculated.

21. An image-layout-evaluation-processing program according to claim 19, wherein a layout that is set by a user at will is set as an initial layout, the equipotential line of the initial layout is obtained, the layout quality is evaluated from the shape of the equipotential line, the initial layout is gradually modified, the equipotential line is obtained for each layout, and the layout quality is evaluated from the shape of the equipotential line, then the most suitable layout is selected from the layouts.

22. An image-layout-evaluation-processing program according to claim 19, wherein a template that sets a predetermined layout is prepared in advance, a layout complying with the template is set as an initial layout, the equipotential line of the initial layout is obtained, the layout quality is evaluated from the shape of the equipotential line, the initial layout is gradually modified, the equipotential line is obtained for each layout, and the layout quality is evaluated from the shape of the equipotential line, then the most suitable layout is selected from the layouts.

23. An image-layout-evaluation-processing program according to claim 21, wherein, when the combined images include a plurality of elements, an attribute is written for each element, the attribute indicating a characteristic required for performing layout, and the attributes are referred to for obtaining the most suitable layout.

24. An image-layout-evaluation-processing program according to claim 22, wherein, when an attribute that indicates a characteristic required for performing layout is written for each of the elements, the template can perform layout complying with the attributes.

25. An image-layout-evaluation-processing program according to claim 19, wherein processing for evaluating the layout quality from the shape of the equipotential line comprises:
   determining an undulation magnitude of the equipotential line; and
   determining that a layout that has an equipotential line with low undulation magnitude is a good layout.

26. An image-layout-evaluation-processing program according to claim 25, the undulation magnitude of the equipotential line being obtained as the complexity of the equipotential line and the complexity being obtained from the relation between the length of the equipotential line and the area of a plane surrounded by the equipotential line.

27. An image-layout-evaluation-processing program according to claim 26, wherein, when the value of the complexity becomes lower, the complexity becomes lower, and a layout that has the lowest complexity is determined to be a most suitable layout.

* * * * *